(12) United States Patent
Swearingen et al.

(10) Patent No.: US 8,548,889 B1
(45) Date of Patent: Oct. 1, 2013

(54) METHOD AND SYSTEM FOR GRAPHICALLY DIFFERENTIATING USER PREFERRED SECURITIES FROM ONE ANOTHER

(75) Inventors: Bradley J. Swearingen, Round Rock, TX (US); David S. Harding, Austin, TX (US); Brant C. Lewis, Austin, TX (US); Richard Munoz, Jr., Cedar Park, TX (US); Gregory Scott Mogonye, Austin, TX (US); Gregory Ferris, Austin, TX (US); Philip R. Berber, Austin, TX (US)

(73) Assignee: Charles Schwab & Co., Inc., San Francisco, CA (US)

( * ) Notice: Subject to any disclaimer, the term of this patent is extended or adjusted under 35 U.S.C. 154(b) by 149 days.

(21) Appl. No.: 12/786,762

(22) Filed: May 25, 2010

Related U.S. Application Data

(63) Continuation of application No. 09/569,656, filed on May 12, 2000, now Pat. No. 7,752,110.

(51) Int. Cl.
*G06Q 40/00* (2012.01)
(52) U.S. Cl.
USPC .................. 705/36 R; 705/35; 705/37; 705/38
(58) Field of Classification Search
USPC ............................... 705/35, 36, 37, 38, 36 R
See application file for complete search history.

(56) References Cited

U.S. PATENT DOCUMENTS

| | | | |
|---|---|---|---|
| 4,334,270 A | 6/1982 | Towers | |
| 4,346,442 A | 8/1982 | Musmanno | |
| 4,376,978 A | 3/1983 | Musmanno | |
| 4,597,046 A | 6/1986 | Musmanno et al. | |
| 4,774,663 A | 9/1988 | Musmanno et al. | |
| 4,885,685 A | 12/1989 | Wolfberg et al. | |
| 4,910,676 A | 3/1990 | Alldredge | |
| 4,989,141 A | 1/1991 | Lyons et al. | |
| 5,220,500 A | 6/1993 | Baird et al. | |

(Continued)

FOREIGN PATENT DOCUMENTS

WO   WO 96/06402 A1   2/1996

OTHER PUBLICATIONS

Barra, Inc. Press Release entitled "Barra Provides Combined Style Analysis and Asset Allocation Capabilities," Sep. 4, 1996.

(Continued)

*Primary Examiner* — Nga B. Nguyen
(74) *Attorney, Agent, or Firm* — Kilpatrick Townsend & Stockton LLP

(57) ABSTRACT

A system for graphically differentiating user preferred securities from one another is disclosed. The system comprises a server system (12) and a client system (14). The server system (12) is in communication with a security data source (26) that provides security data on a plurality of securities. The client system (14) is in communication with the server system (12) and provides M user specific criteria to the server system (12). The server system (12) then analyzes the security data based upon the M user specific criteria and identifies user preferred securities from the plurality of securities. The server system (12) provides the client system (14) with data relating to the user preferred securities. The client system (14) uses N user specific parameters received from an input device (16, 18) to generate an N dimensional graph that is populated with icons representing the user preferred securities, thereby graphically differentiating the user preferred securities from one another on a display device (20).

23 Claims, 14 Drawing Sheets

(56) References Cited

U.S. PATENT DOCUMENTS

| | | |
|---|---|---|
| 5,222,019 A | 6/1993 | Yoshino et al. |
| 5,454,104 A | 9/1995 | Steidlmayer et al. |
| 5,523,942 A | 6/1996 | Tyler et al. |
| 5,692,233 A | 11/1997 | Garman |
| 5,799,287 A | 8/1998 | Dembo |
| 5,864,827 A | 1/1999 | Wilson |
| 5,930,762 A | 7/1999 | Masch |
| 6,012,044 A | 1/2000 | Maggioncalda et al. |
| 6,061,662 A | 5/2000 | Makivic |
| 6,073,115 A | 6/2000 | Marshall |
| 6,078,904 A | 6/2000 | Rebane |
| 6,161,098 A * | 12/2000 | Wallman ............ 705/36 T |
| 6,275,814 B1 | 8/2001 | Giansante et al. |
| 6,546,375 B1 | 4/2003 | Pang et al. |
| 6,601,044 B1 | 7/2003 | Wallman |
| 7,752,110 B1 * | 7/2010 | Swearingen et al. ....... 705/36 R |

OTHER PUBLICATIONS

"Do You Know Your Left from Your Right?" Interface. 2nd Quarter 1998, vol. 5, Issue 2.

Fersko-Weiss, Henry. "Dialing for Profits," Personal Computing. p. 180, vol. 10, No. 5, May 1986.

Ibbotson Associates' Sales Brochure. Apr. 1998.

* cited by examiner

METHOD AND SYSTEM FOR GRAPHICALLY DIFFERENTIATING USER PREFERRED SECURITIES FROM ONE ANOTHER

CROSS-REFERENCE TO RELATED APPLICATION

This application is a continuation of U.S. patent application Ser. No. 09/569,656, filed May 12, 2000 entitled "Method and System for Graphically Differentiating User Preferred Securities From One Another," which is herein incorporated by reference in its entirety for all purposes.

TECHNICAL FIELD OF THE INVENTION

This invention relates in general to a computer method and system for selecting a security and, in particular, to a computer method and system for graphically differentiating user preferred securities from one another in a multi-dimensional graph.

BACKGROUND OF THE INVENTION

Without limiting the scope of the present invention, its background will be described with regard to trading common stock, as an example.

In trading common stock, there are three fundamental factors an investor must consider. These factors are what stock to buy, when to buy that stock and when to sell that stock. There are enumerable models that attempt to help the investor identify these factors each of which are based upon particular criteria. Some of the models are best suited for the long term investor using a buy and hold approach. Other models are better suited for the short term investor including, for example, the day trader.

A typical long term investor may perform substantial research into a particular company in an effort to evaluate the future success of that company. For example, a long term investor may evaluate whether the company has products or services that are likely to have an increase in sales, the effectiveness of a company's research and development, the profit margin of the company, the size and effectiveness of the company's sales organization, labor relations within the company, the quality of management personnel at the company, the competitiveness of the company in relation to other companies in the industry and long range outlook for profits.

In addition to these business related factors, the long term investor may look at factors such as whether the company typically pays dividends on common stock, the price to earnings ratio of the stock and the market capitalization of the company as well as earnings, revenue and net income of the company. On the other hand, an investor that is interested in short term investments may not perform such detailed research and instead may focus on factors such as volume of trades in that stock, proximity to a milestone such as a fifty two week high, difference between current volume and a historical volume, number of daily highs or money flow in identifying a stock of interest.

Once an investor has identified a stock of interest, the investor must then determine when to buy that stock. A long term investor might buy the stock regardless of price if it is being offered by a good company in a good industry banking on long term growth. Alternatively, a long term investor may monitor factors such as business cycles, the trend of interest rates, governmental attitudes and the direction of inflation in making a decision to buy. The short term investor, however, may be more interested in such factors as the volatility of the stock or the liquidity of the stock in making such a buy decision.

The next step for an investor once they have entered such a position in a stock is to determine when to sell that stock. A long term investor may make a decision to sell based upon factors such as a fundamental change in a company that does not comport with the investor's original criteria for buying stock in that company, a change in management in the company, under performance of the stock, the stock reaching an unacceptable low, a belief that the stock has peaked or simply a belief that another investment has better long term prospects. While some of these factors may also be important to a short term investor, a short term investor may focus more heavily on such factors as the continued momentum of the stock or simply making certain all open positions are closed by the end of a day.

Regardless of the investment strategies, however, these three factors, what to buy, when to buy and when to sell remain key elements in any successful investment strategy. Therefore, a need has arisen for a system and method for identifying stocks that meet specific criteria selected by the investor. A need has also arisen for such a system and method that allows the investor to differentiate between the stocks that meet the investor's criteria.

SUMMARY OF THE INVENTION

The present invention disclosed herein comprises a computer based system and method for graphically differentiating user preferred securities from one another. The system and method allow investors to identify securities that meet specific criteria selected by the investor. In addition, the system and method allow investors to differentiate between the securities that meet the investor's criteria.

The system of the present invention comprises a server system and a client system that are communicably linked together. The server system is in communication with a security data source that provides security data relating to a plurality of securities. The client system interrogates the server system by providing user specific criteria to the server system. These user specific criteria are presented to the server system in the form of a query that is processed by the server system to identify which securities, from the plurality of securities, meet the user specific criteria. The securities that meet the user specific criteria are referred to herein as the user preferred securities. Any number of user specific criteria can be included in the query to the server system. The number of user specific criteria will generically be referred to herein as M user specific criteria, wherein M is a positive integer. As an example, the investor may enter a query with three user specific criteria such as top ten securities that are (1) trading at least 2% above the 60 simple moving average, (2) that are trading at least 15% above open price and (3) that have hit at least 10 daily highs.

Once the user preferred securities have been identified, the server system provides the client system with data relating the user preferred securities. The client system uses this data to populate a multi-dimensional graph which is constructed based upon a set of user specific parameters. The user specific parameters are used to define the display configuration on the multi-dimensional graph. Any number of user specific parameters may be selected by the user. The number of user specific parameters will generically be referred to herein as N user specific parameters, wherein N is a positive integer. The number of dimensions of the multi-dimensional graph is the same as the number of user specific parameters. Thus, the multi-dimensional will have N dimensions. As an example, the investor may enter five user specific parameters such as current price, close price, change from close, volume and change from open as the user specific parameters. These five user specific parameters will then be used by the client system to generate a graph having five dimensions. As such, after the user preferred securities have been identified based upon the user specific criteria and the display configuration of the multi-dimensional graph has been defined based upon the user specific parameters, the user preferred securities may be graphically differentiated from one another on a display device.

Use of the present system allows each investor to create a trading model that suits their goals. Each investor is able to identify user preferred securities based upon that investor's user specific criteria. Once these user preferred securities are identified, the investor may view these user preferred securities in a multi-dimensional graph that is generated based upon that investor's user specific parameters, thereby graphically differentiating the user preferred securities from one another. Using the present system, the investor may modify their trading model, for example, by changing the user specific parameters to view this set of user preferred securities in a different graphical configuration, by changing the user specific criteria to generate a new set of user preferred securities or both. In addition, the user may simultaneously create and graphically display numerous sets of user preferred securities such that the user may utilize multiple trading models.

In one embodiment of the system of the present invention, the security data may be a real-time security data stream that is parsed by the server system into a predetermined number of security related factors. The security data may include fundamental data, historical data, and analytical data relating to the plurality of securities as well as other data that a security trader may find valuable.

In one embodiment of the system of the present invention, the user may select at least 3 user specific parameters which will be used to create a graph having at least 3 dimensions for graphically differentiating the user preferred securities from one another. In another embodiment of the system of the present invention, the user may select at least 5 user specific parameters which will be used to create a graph having at least 5 dimensions for graphically differentiating the user preferred securities from one another. Generally speaking, the user will select N user specific parameters that are presented in an N dimensional graph. The N dimensions are graphically represented by, for example, icons that are positioned within a coordinate system of axes, icons of various colors, icons of various sizes, icons of various shapes, icons with various shadings, icons including character symbology designations and the like.

In the method of the present invention, security data for a plurality of securities is provided to a server system from a security data source. Next, a client system provides user specific criteria for analyzing the security data to the server system. The server system then identifies the user preferred securities from the plurality of securities based upon the user specific criteria. The server system returns to the client system data relating to the user preferred securities. The client system receives and processes a set of user specific parameters used to generate the display configuration of a multi-dimensional graph. Finally, the user preferred securities are populated into the multi-dimensional graph on the client system, thereby graphically differentiating the user preferred securities from one another on the client system.

The present invention also comprises a computer program embodied on a computer readable medium on the server system and a computer program embodied on a computer readable medium on the client system that are in communication with one another. The computer program embodied on the computer readable medium on the server system includes a code segment for receiving security data for a plurality of securities from a security data source, a code segment for receiving user specific criteria from a client system, a code segment for analyzing the security data based upon the user specific criteria, a code segment for identifying the user preferred securities from the plurality of securities and a code segment for providing the client system with data relating to the user preferred securities to be graphically represented in a multi-dimensional graph on the client system.

The computer program embodied on the computer readable medium on the client system includes a code segment for providing user specific criteria to the server system, a code segment for receiving user specific parameters from the user for generating a display configuration of a multi-dimensional graph, a code segment for receiving data from the server system relating to the user preferred securities and a code segment for populating the multi-dimensional graph with icon representing the user preferred securities.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
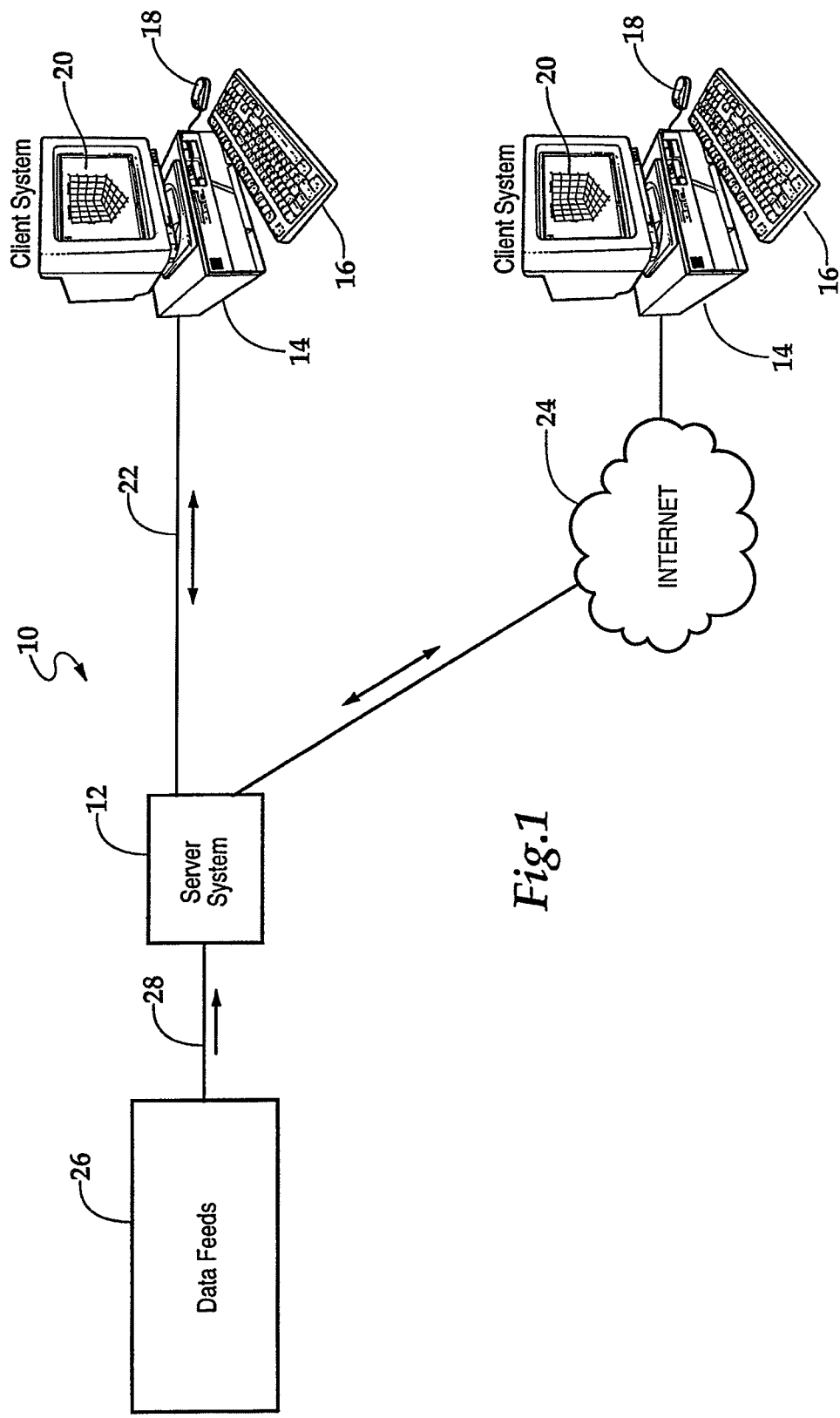
FIG. 1 is a platform diagram of a system for graphically differentiating user preferred securities from one another in a multi-dimensional graph of the present invention.

Referring now to FIG. 1, therein is depicted a platform layout of the system for graphically differentiating user preferred securities from one another in a multi-dimensional graph of the present invention that is generally designated 10. System 10 includes a server system 12 and a client system 14. Client system 14 may include any number of peripheral input, storage and display devices such as a keyboard 16, a mouse 18 and a monitor 20. Server system 12 may communicate with client system 14 by any suitable means. In one illustrated embodiment, server system 12 is in communication with a client system 14 via a direct connection such as a T1 line, a frame, a dial up modem or the like. In the other illustrated embodiment, server system 12 is in communication with the other client system 14 via an internet connection 24.

Server system 12 is also in communication with one or more security data sources 26 via a T1 line, a high speed modem or other transmission line 28 using, for example, a direct socket connection such as a TCP/IP connection. Security data sources 26 provide data feeds to server system 12 from a plurality of sources such as PC Quote, S&P Comstock, NQDS and the like that contain all types of information relating to thousands of securities that are traded, for example, on the New York Stock Exchange (NYSE), NASDAQ, Electronic Communications Networks (ECN) and the like. The data feeds contain a variety of information relating to each security. For example, the data feeds may contain level one information which is best ask and best bid information as well as time and sales information and level two information which is includes detailed market maker/exchange information. In addition, the data feeds may include fundamental information such as market capitalization, sector information, price to earning ratio, 52 week highs and lows and the like.

Server system 12 includes an application programming interface that takes each data feed from the various security data sources 26, which are typically in a proprietary format, and processes it for real-time dissemination to client system 14. As the amount of information received and processed by server system 12 from security data sources 26 is voluminous, each client system 14 typically receives only the information that the user of that client system 14 requests. As such, each client system 14 requests and receives only a small subset of the information processed by server system 12. For example, one user may be interested in securities that are approaching a 52-week high and that have a five day average volume above a particular threshold. In this case, the user would make the appropriate request from a client system 14 to the server system 12 for processing. The server system 12 then returns only the information relating to the securities that meet this user's criteria to that client system 14. Likewise, another user may be interested in securities having a high current volume that fall within a particular price range. Again, in this case, the user would make the appropriate request from a client system 14 to server system 12 which would return only the information relating to the securities that meet this user's criteria to that client system 14.

Figure 2:
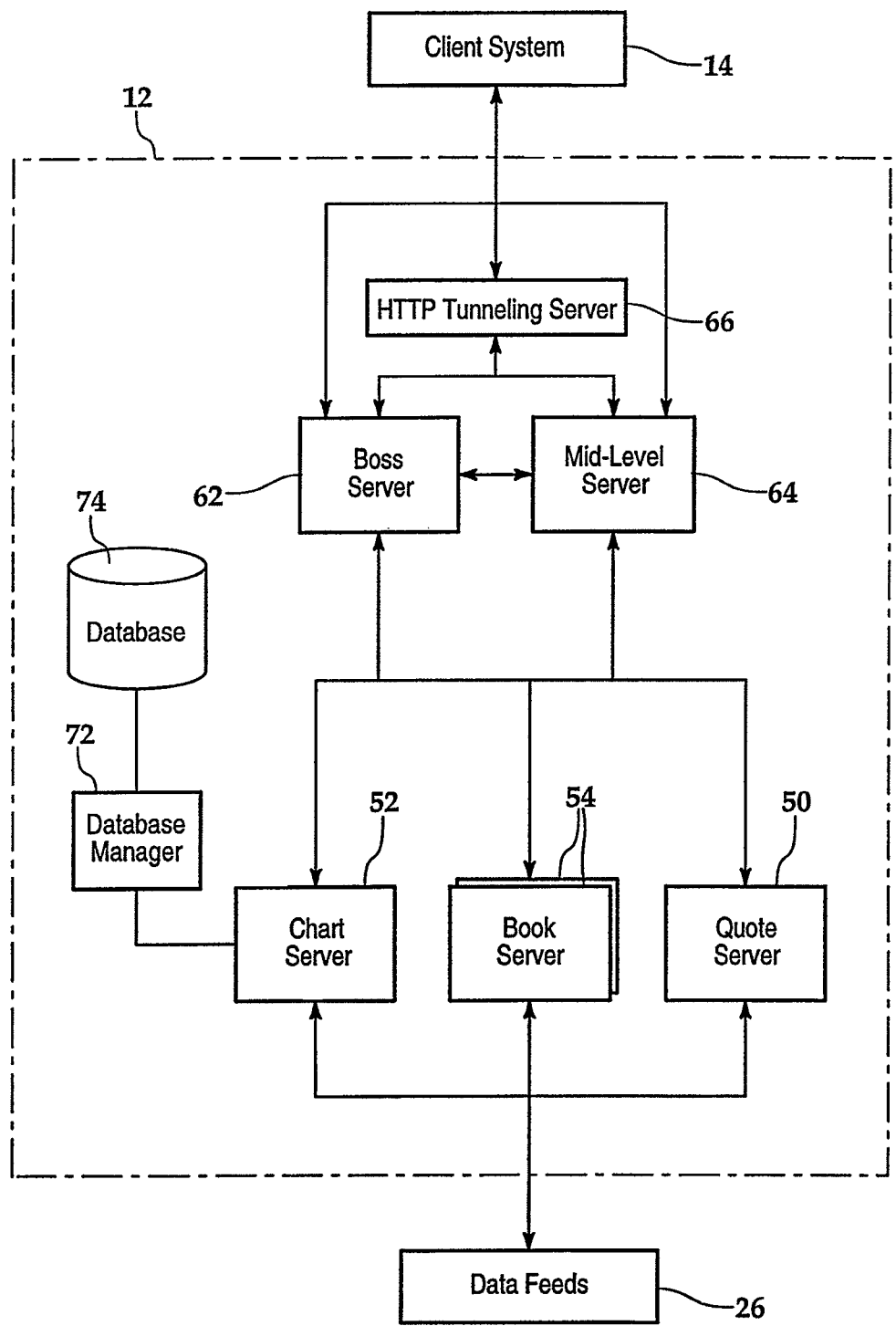
FIG. 2 is a block diagram of a server system of a system for graphically differentiating user preferred securities from one another in a multi-dimensional graph of the present invention.

Referring now to FIG. 2, therein is depicted a more detailed diagram of server system 12 of the system for graphically differentiating user preferred securities from one another. Server system 12 comprises numerous integrated servers that enable the processing of security data received from security data sources 26 for dissemination to various client systems 14 based upon the request made from each client system 14. Server system 12 includes a quote server 50, a chart server 52 and book servers 54. Quote server 50 receives the data feed from one of the security data sources 26 and parses the data based upon the feed parsing API. The parsed information may be sent via direct connection to a client system 14 upon request by a client system 14. In the illustrated embodiment, however, the connection between quote server 50 and client system 14 include a boss server 62, a mid-level server 64 and an HTTP tunneling server 66 as will be explained in more detail below. As such, quote server 50 may disseminate real-time first level security data, real-time second level security data and the like to client system 14. For speed of delivery to client systems 14, some of this data preferably resides in the cache memory of quote server 50 or may alternatively reside in RAM.

Chart server 52 receives the data feed from one of the security data sources 26 and parses the data based upon the feed parsing API. The parsed information is further processed by database manager 72 such that information relating to the securities may be stored in database 74. Database 74 is used for historical charting of security data. For example, database 74 builds one, two, three and five minute charts for intraday activity as well as historical charts for daily volume, daily highs and lows and the like for specified time increments such as the prior week, month or year. Database 74 is preferably an in-memory database utilizing cache memory and RAM such that information requested by a client system 14 can be disseminated as fast as possible. For example, information relating to the most frequently requested securities stays in cache memory while information relating to the less frequently requested securities resides in RAM.

Each book server 54 receives the data feed from one of the security data sources 26 and parses that data based upon the feed parsing API. Each book server 54 receives data from a specific ECN. The ECN data feeds contain not only the first and second level security data but also information relating to all the available asks and bids of each security.

Mid-level server 64 monitors information on a subset of the securities on which data feeds are received. While quote server 50, chart server 52 and book servers 54 monitor all securities, perhaps 12,000 to 15,000 or more, mid-level server only monitors those securities that are frequently requested by a client system 14, perhaps several hundred to a few thousand. For example, mid-level server 64 monitors all open positions that users presently have as well as additional securities that are being watched by such users, i.e., those that are part of real-time user requests and historically active securities. Use of mid-level server 64 adds flexibility to server system 12 by reducing the load on the other servers. In addition, the use of mid-level server 64 enhances the speed at which information is disseminated to client systems 14 by, among other things, gathering, combining and placing in cache memory data from quote server 50, chart server 52 and book servers 54 such that a request does not have to be processed by more than one server.

It should be understood by those skilled in the art that the use of the term server herein may mean a single physical server or multiple physical servers. For example, it is preferable to have multiple quote servers, at least one for each exchange and multiple book servers, at least one for each ECN. Likewise, it is preferable to have multiple chart servers and multiple mid-level servers depending upon the amount of information being processed. Also, it should be understood by those skilled in the art that the servers described herein that make up server system 12 may comprise any suitable processor. For example, a Dell dual 500 MHZ processor with 512 MB of memory operating on a Microsoft Windows NT 4.0 platform has been found to be suitable.

In addition to the above described servers, server system 12 may include a boss server 62 that manages the operation of the other servers. Boss server 62 optimizes the processing of server system 12 by routing connection requests from client systems 14 to the servers within server system 12, for example to a specific mid-level server 64, that are presently operating with appropriate capacity to handle the new connection which avoids overloading any of the servers.

For connection between server system 12 and client systems 14 over the internet, server system 12 may also includes HTTP tunneling server 66. HTTP tunneling server 66 allows client systems 14 to work through fire walls, proxy servers and the like.

Figure 3:
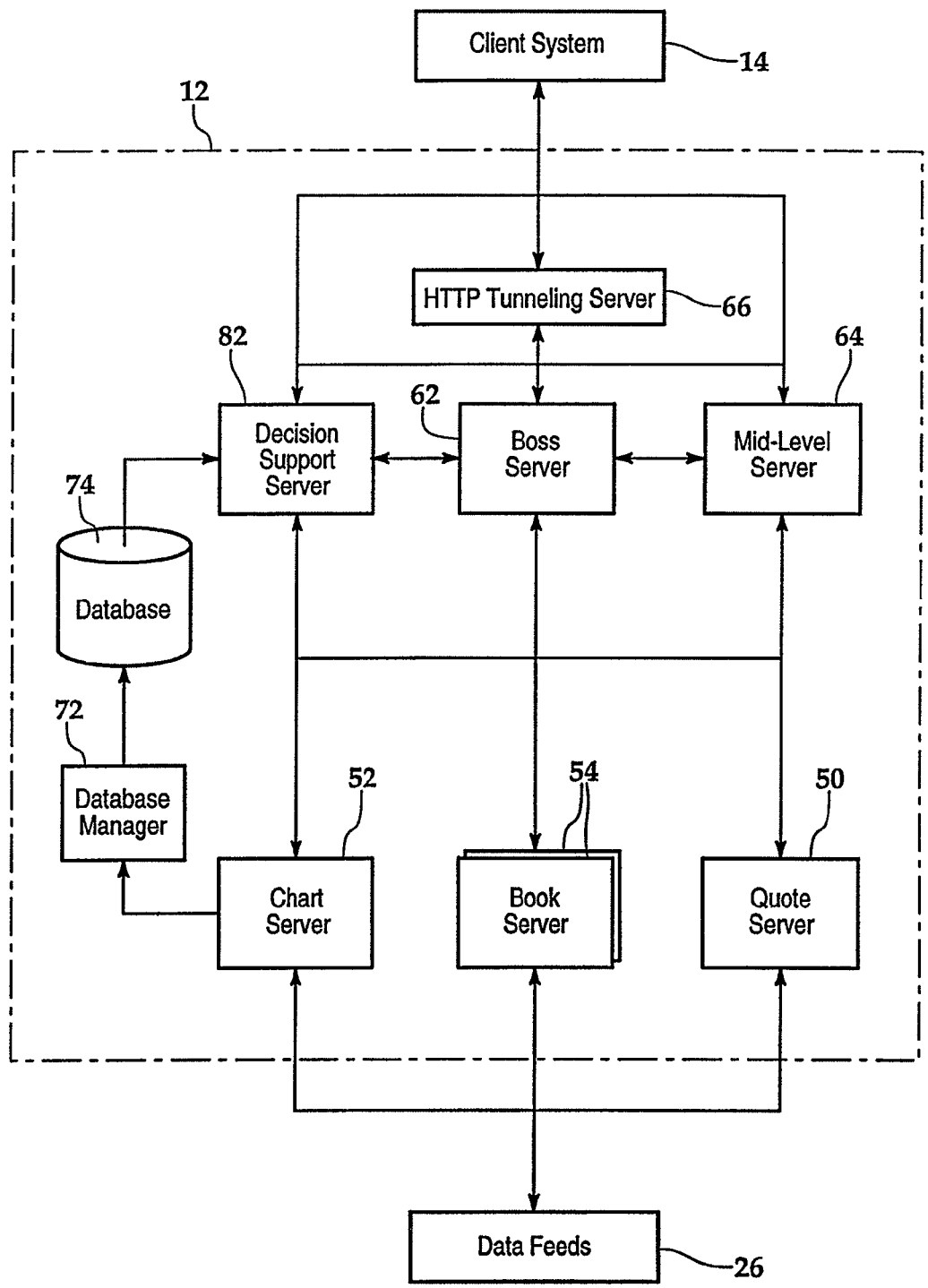
FIG. 3 is a block diagram of another aspect of a server system of a system for graphically differentiating user preferred securities from one another in a multi-dimensional graph of the present invention.

Referring now to FIG. 3, therein is depicted a more detailed diagram of server system 12 of the system for graphically differentiating user preferred securities from one another in a multi-dimensional graph of the present invention. In addition to the above described servers, server system 12 also comprises a decision support server 82. As with the mid-level server 64 described above with reference to FIG. 2, decision support server 82 perform specific tasks which enable server system 12 to be more responsive to client systems 14.

Decision support server 82 provides the data feed to client systems 14 that enables the creation of a multi-dimensional graph on the client systems 14 that allows for the graphical differentiation of user preferred securities from one another. In the illustrated embodiment, decision support server 82 receives data feeds from chart server 52, book servers 54 and quote server 50. In addition, decision support server 82 receives a data feed from data compiled in database 74. As explained in more detail below, decision support server 82 receives queries that contain various criteria from users of a client system 14 which are processed by decision support server 82 to identify particular securities that are of interest to users of a client system 14. The criteria range from fundamental information such as the market cap, dividends, 52 week highs and lows to technical analysis including Bollinger bands, RSI, moving averages, money flow, and other charting techniques. More specifically, but by way of example only, the following is a list of some the criteria that may be utilized by decision support server 82:

Current Price—Current market price;
Volume—Number of shares placed in the market that day;
High—Highest price a security has reached that day;
Low—Lowest price a security has reached that day;
Open—Price at the most recent open;
Close—Price at the most recent close;
Daily High Count—Number of times a new High has been reached that day;
Daily Low Count—Number of times a new Low has been reached that day;
52 Week High—Highest price a security has reached in the past 52 weeks;
52 Week Low—Lowest price a security has reached in the past 52 weeks;
52 Week High-Daily High—Shows the distance between the 52 Week High and the Daily High;
52 Week Low-Daily Low—Shows the distance between the 52 Week Low and the Daily Low;
Gap—Difference between most recent close and open prices expressed as a dollar value;
% Gap—Difference between most recent Close and Open prices expressed as a percentage;
Change from Close—Change in the price from the Close expressed as a dollar value;
Change from Close (%)—Change in the price from the Close expressed as a percentage;
Change from Open—Change in the price from the Open expressed as a dollar value;
Change from Open (%)—Change in the price from the Open expressed as a percentage;
Change from 5 Day Avg Close—Difference between the average close for the last five days and the Current Price expressed as a dollar value;
Change from 5 Day Avg Close (%)—Difference between the average close for the last five days and the Current Price expressed as a percentage;
Change from 20 Day Avg Close—Difference between the average close for the last 20 days and the Current Price expressed as a dollar value;
Change from 20 Day Avg Close (%)—Difference between the average close for the last 20 days and the Current Price expressed as a percentage;
Change from 1 Month Avg Close—Difference between the average close for the last month and the Current Price expressed as a dollar value;
Change from 1 Month Avg Close (%)—Difference between the average close for the last month and the Current Price expressed as a percentage;
Change from 6 Month Avg Close—Difference between the average close for the last 6 months and the Current Price expressed as a dollar value;
Change from 6 Month Avg Close (%)—Difference between the average close for the last 6 months and the Current Price expressed as a percentage;
Change from YTD Avg Close—Difference between the average close for the last year and the Current Price expressed as a dollar value;
Change from YTD Avg Close (%)—Difference between the average close for the last year and the Current Price expressed as a percentage;
5 Day Avg Volume—Average of the volume over the last five days;
20 Day Avg Volume—Average of the volume over the last 20 days;
1 Month Avg Volume—Average of the volume over the last month;
6 Month Avg Volume—Average of the volume over the last six months;
YTD Avg Volume—Average of the volume over the last year;
Volume Over Yesterday's Vol (%)—Difference between current Volume and yesterday's volume expressed as a percentage;
Volume Over 5 Day Avg Vol (%)—Difference between current Volume and the average volume for the last five days, expressed as a percentage;
5 Day High—Highest price a security has reached over the last five days, including today;
20 Day High—Highest price a security has reached over the last 20 days, including today;
1 Month High—Highest price a security has reached over the last month, including today;
YTD High—Highest price a security has reached over the last year, including today;
5 Day Low—Lowest price a security has reached over the last five days, including today;
20 Day Low—Lowest price a security has reached over the last 20 days, including today;

1 Month Low—Lowest price a security has reached over the last month, including today;

YTD Low—Lowest price a security has reached over the last year, including today;

15/60/120 Day SMA—Average of the last 15, 60 or 120 days' close values, including today;

15/60/120 Day EMA—While similar to the SMA above, the exponential moving average uses a "smoothing factor" to give more weight to recent prices, while still allowing all data in the window to influence the average;

Rate of Change—Change in price between the current price and the close 6 days ago, divided by the price 6 days ago;

10/30/50 Day RSI—Relative Strength Index indicates the degree of positive and negative movement by the stock on a scale of 0 (weakest) to 100 (strongest). Determined by figuring the ratio of the average up closes for the last 9, 29 or 49 days (using today's Current Price for the 10th, 30th or 50th day) divided by the sum of the average up closes and the average down closes for the same period. This ratio is multiplied by 100;

10/30/50 Day RSI from Close—Relative Strength Index indicates the degree of positive and negative movement by the stock on a scale of 0 (weakest) to 100 (strongest). Determined by figuring the ratio of the average up closes for the last 10, 30 or 50 days (not including today if prior to close) divided by the sum of the average up closes and the average down closes for the same period. This ratio is multiplied by 100;

Bollinger Bands—The center is an n-interval exponential moving average. The top and bottom lines are placed in standard deviations above and below the centerline. Since standard deviations are a measure of volatility, the bands widen during volatile price action and contract when the trading range tightens;

MACD—Trend-following momentum indicator that uses three exponential moving averages: a short or fast average, a long or slow average and an exponential average of their difference, the last being used as a signal or trigger line;

OBV (On Balance Volume)—Indicator that relates volume to price changes by adding volume to a running total when the price closes up for a period and subtracts the volume if the stock closes down for a period;

20/40/60 Day Momentum—Measures the amount that a security's price has changed over the last 20, 40 or 60 days. If today hasn't closed yet, it uses the current price for today's close;

20/40/60 Day Momentum from Close—Measures the amount that a security's price has changed over the last 20, 40 or 60 closes;

Money Flow—Indicates with a dollar value whether money is flowing into or out of a security. Calculated by subtracting the downtick and adding the uptick for every tick of the trading day;

Money Flow (%)—Indicates the percentage at which money is flowing into or out of a security;

Williams % R—Measures the percentage to which a security is overbought or oversold based on the position of the current period's close to the range of prices over a time period;

PE Ratio—Measures how expensive a security is based upon the cost an investor in a security must pay per dollar of current annual earnings;

EPS Ratio—Net income divided by the number of shares of a company participating in the profits;

Dividend—Taxable payment declared by a company's board of directors and given to its shareholders out of the company's current or retained earnings;

Market Cap—Market value of all of a company's outstanding shares;

PS Ratio—A security's capitalization divided by its sales over the previous 12 months;

Earnings—Revenues minus cost of sales, operating expenses, and taxes, over a given period of time;

Net Income—Gross sales minus taxes, interest, depreciation, and other expenses;

Revenue—Total dollar amount collected for goods and services provided;

DPS Ratio—Dividends Per Share Ratio indicates the to dollar amount of dividends issued to stockholders per share;

Shares Outstanding—Shows number of shares of a corporation which have been issued;

Stock Exchange—Shows the exchange (NYSE, NASDAQ, etc.) on which a security trades;

Sector—Shows the general industry classification of the company; and

Industry—A specific category describing the company's business activity.

Figure 4:
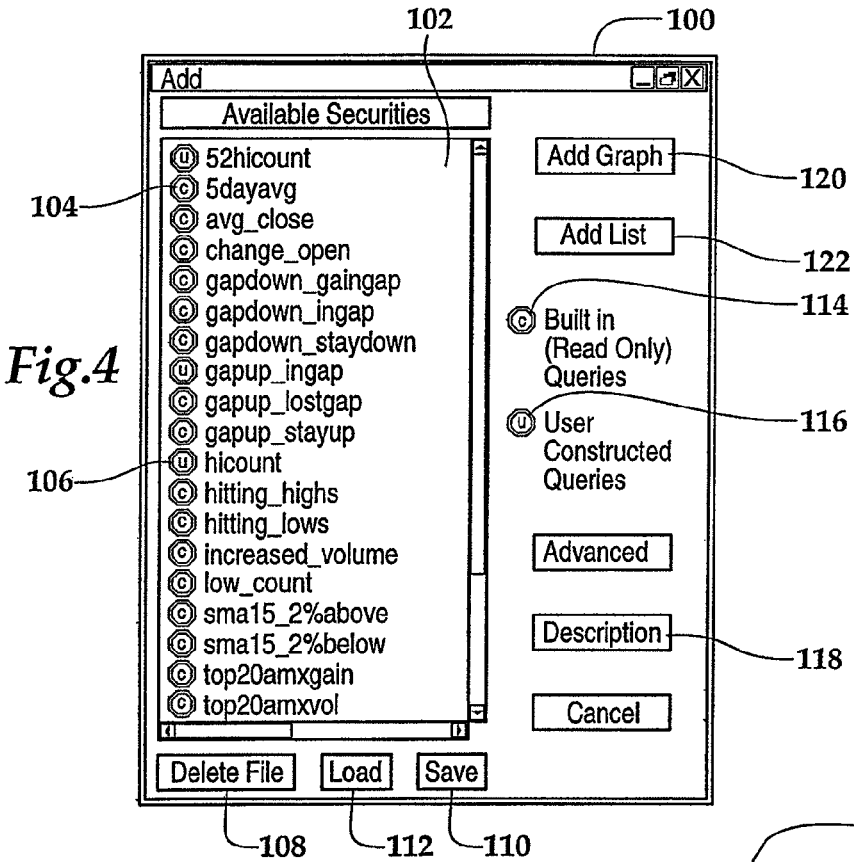
FIG. 4 is a graphical user interface of a system for graphically differentiating user preferred securities from one another in a multi-dimensional graph of the present invention.

On the client side, the user of a client system 14 makes a request on decision support server 82 based upon one or more of these and other available criteria. The user may select any number of criteria which will be referred to herein as M user specific criteria. Decision support server 82 then identifies the securities that meet these M user specific criteria which are referred to herein as user preferred securities. As best seen in FIG. 4, the user of client system 14 opens an Add query window 100 which allows the user to select from built-in and user constructed preloaded queries or allows the user to construct new queries. These queries define the M user specific criteria used to select the user preferred securities. More specifically, Add query window 100 includes an available queries selection box 102 that shows a list of available queries. The built-in queries are indicated by a icon, such as 5 dayave query 104. The user constructed queries are indicated by a "u" icon, such as hicount query 106. Add query window 100 also includes Delete File button 108 that allows a user to delete user constructed queries, a Save button 110 that allows the user to save user constructed queries or query lists and a Load button 112 that allows the user to access a saved query list. Add query window 100 allows the user to display or hide built-in, user constructed queries or both by operating a Built-in query button 114 and a User constructed queries button 116. By selecting a particular query and pushing Description button 118, the detailed search criteria of the selected query is provided to the user. For example, if the user selected hicount query 106 and requested a description, a description dialog box would appear having a description such as "top 20 stocks hitting daily highs today."

Add query window 100 allows the user to construct a multi-dimensional graph that differentiates between the user preferred securities that are identified as a result of the user specific criteria in the selected query. By pressing the Add Graph button 120, the user preferred securities are graphically represented to the user on client system 14 as to will be explained in more detail below. Alternatively or additionally, the user may view the user preferred securities in a list format by pressing the Add List button 122.

Figure 5:
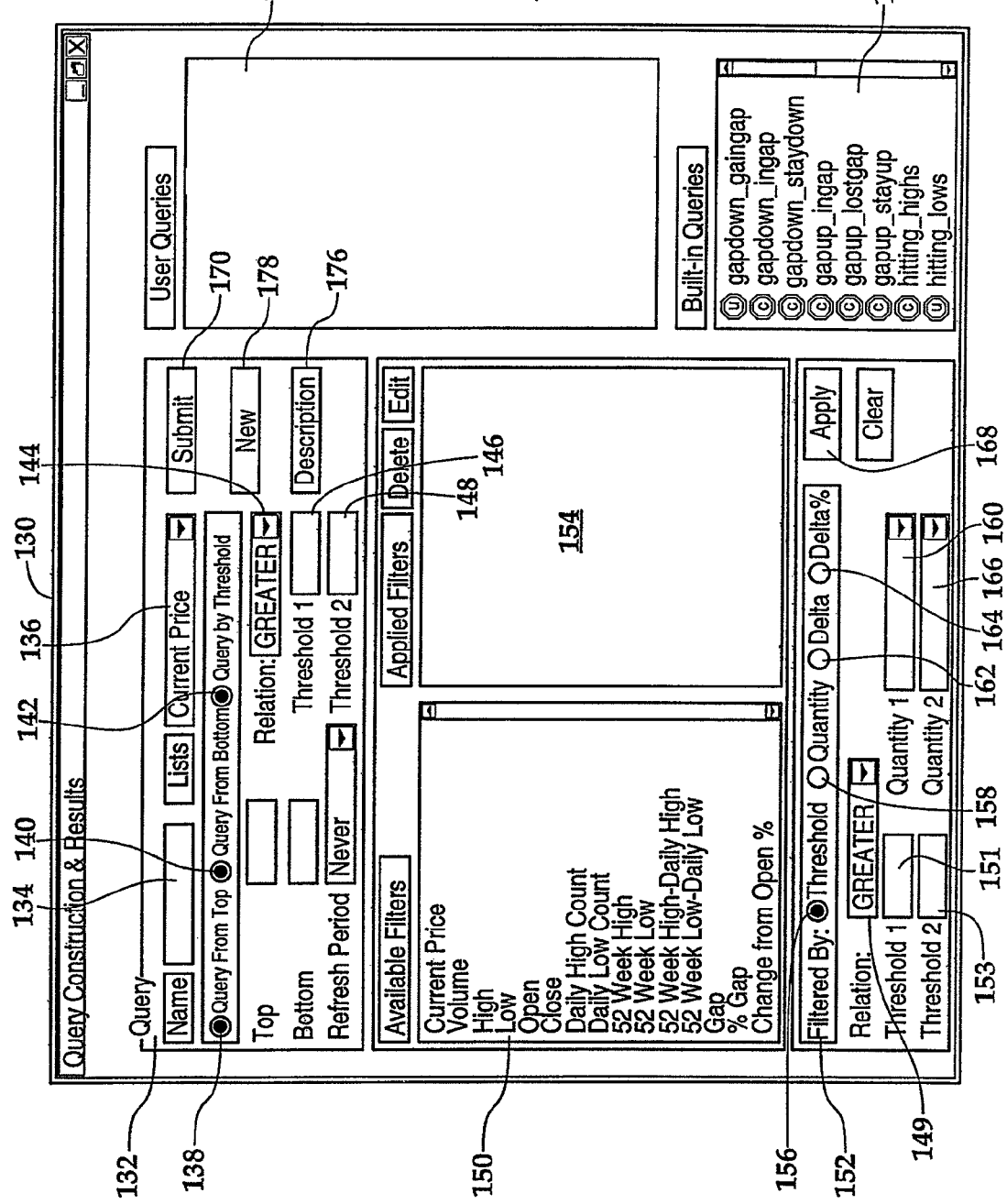
FIG. 5 is a graphical user interface of a system for graphically differentiating user preferred securities from one another in a multi-dimensional graph of the present invention.

The user may construct new queries by pushing the Advanced button 124 in the Add query window 100. This will pull up a Query Construction & Results window 130 as seen in FIG. 5. In the Query Construction & Results window 130, the first step in creating a query is specifying in Query box 132, a criteria and a condition that securities must satisfy to be included in the query results. The user may then add more filters to further refine the query. For example, a user selects a name for the query in name box 134. Then, the user chooses the criteria to query from the pull-down menu in List box 136. The user determines how to limit the query results by selecting the Query from Top button 138, which returns the top N securities sorted by the query criteria that meet the query and filter requirements, the Query from Bottom button 140 which returns the bottom N securities sorted by the query quantity that meet the query and filter requirements or the Query by Threshold button 142 which prompts the user to select a relationship in Relation box 144 (i.e. greater, between, etc.) and enter a number in the Threshold 1 box 146 and the Threshold 2 box 148 if BETWEEN is selected in Relation box 144.

To add additional criteria or filters to this query, the user selects a criteria in the Available Filter box 150 which is used in conjunction with various factors selected in the Filtered by box 152 which create the criteria in the Applied Filters box 154. After the user selects the desired criteria from Available Filter box 150, the user selects whether to filter by threshold, quantity, delta or delta percent in Filtered by box 152. If the user selects the Threshold button 156, the user then must also select a relationship in Relation box 149 (i.e. greater, between, etc.) and enter a number in the Threshold 1 box 151 and Threshold 2 field 153 if BETWEEN is selected in Relation box 149. For example, to set a filter that will only list securities with a greater than 15% change from open, the user chooses Change from Open (%) in the Available Filters box 150, GREATER in the Relation box 149 and 0.15 in Threshold 1 box 151.

Selecting the Quantity button 158, allows the user to compare an available filter quantity against another quantity using one of the relationship operators. For example, to set a filter that will only list stocks with a Volume greater than the one month average volume, the user chooses Volume in the Available Filters box 150, GREATER in the Relation box 149 and 1 Month Avg Volume in the Quantity 1 box 160.

Selecting the Delta button 162, allows the user to subtract the selection in the Quantity 1 box 160 from the originally selected criteria. If the difference falls within the Relation/Threshold entered by the user, the security will is appear in the query results. For example, to set a filter that will only list stocks that are ⅛th or less off their 52-week high, the user chooses Current Price in the Available Filters box 150, 52-Week High in the Quantity 1 box 160, GREATER OR EQUAL in the Relation box 149, and −0.125 in Threshold 1 box 151.

Selecting the Delta % button 164, allows the user to subtract the selection made in the Quantity 1 box 160 from the originally selected criteria, then divide the result by the originally selected criteria. If the final result falls within the Relation/Threshold entered by the user, the security will appear in the query results. For example, to set a filter that will only list stocks within 2% above their 60 Day Simple Moving Average, the user chooses Current Price in the Available Filters box 150, 60-Day SMA in the Quantity box 160, BETWEEN in the Relation box 149, 0 (zero) in Threshold 1 box 151, and 0.02 in Threshold 2 box 153.

Once the user has selected all of the desired filters, the user presses the Apply button 168 to add the filter to the query. When the user is finished building the entire query, the user presses the Submit button 170 which saves the query and sends it to decision support server 82 of server system 12. As explained above, the user may view the textual description of the selected query in the User Query list 172 or Built-in Query list 174 by pressing Description button 176. Another query may be created by pressing the New button 178.

Use of the above described built-in queries or user constructed queries allows the user to define the M user specific criteria and design a decision support tool that provides information to the user based upon the users trading style. Once the user has selected a particular query, the user pushes the add graph button 120 of FIG. 4 to generate a multi-dimensional graph for the user that graphically differentiates the user preferred securities from one another.

Figure 6A:
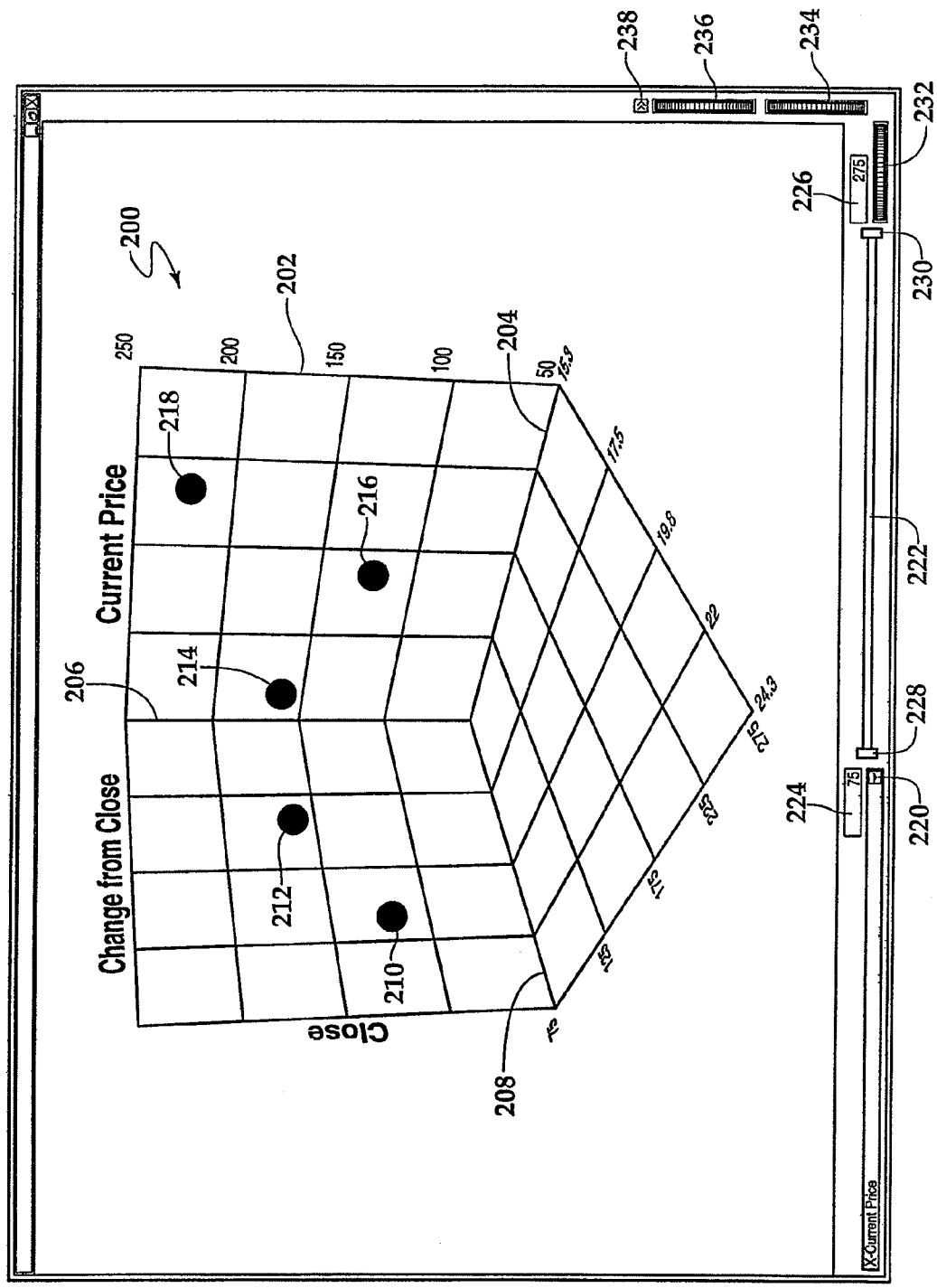
FIGS. 6A-6E are screen diagrams of multi-dimensional graphs illustrating a method for graphically differentiating user preferred securities from one another of the present invention.

As seen in FIG. 6A, a multi-dimensional graph 200 is depicted displaying the results of a user selected query. Graph 200 includes a coordinate system 202 that has an X-axis 204, a Y-axis 206, and a Z-axis 208. Displayed on graph 200 are a variety of icons which represent specific user preferred securities that were identified by decision support server 82 based upon the user specific criteria in the M user selected query. Specifically, five icons representing these user preferred securities are depicted as icon 210, icon 212, icon 214, icon 216 and icon 218.

In the illustrated embodiment, graph 200 is a three dimensional graph wherein the dimensions are represented by the three axes 204, 206, 208 of coordinate system 202. As will be explained in more detail below, the user selects the various parameters that are represented in graph 200. In the illustrated embodiment, the parameter represented by X-axis 204 is current price, the parameter represented by Y-axis 206 is the prior days' close price and the parameter represented by Z-axis 208 is the change in price from close.

Once graph 200 has been generated based upon the M user specific criteria in the user selected query, the user may further differentiate the user preferred securities using various features of the graphical user interface of client system 14. For example, the user may select a particular parameter in the parameter box 220 then modify the display on graph 200 by manipulating slider bar system 222. In the illustrated embodiment, the user has selected the current price parameter in parameter box 220. The end points of the scale of X-axis 204 are displayed in box 224 and box 226. To change this scale, the user may operate sliders 228 and 230 to adjust the scale. For example, if the user is now only interested in securities having a current price greater than 100, the user would operate slider 228 to the right until 100 appeared in the box 224. This operation would hide any securities that are in graph 200 that have a current price is less than 100.

Figure 7:
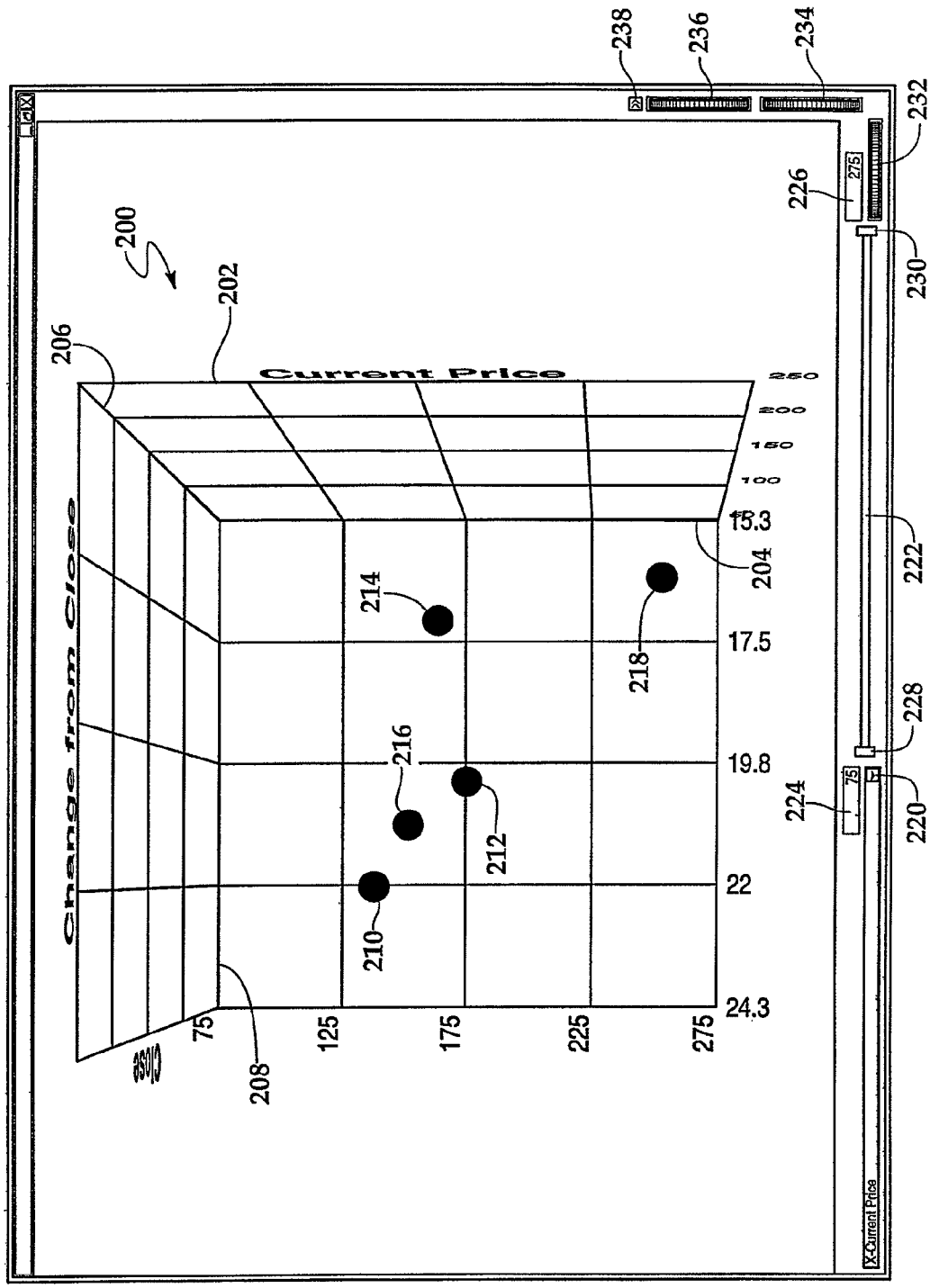
FIG. 7 is screen diagram of the three dimensional graph of FIG. 6A rotated for viewing the xz-plane.

The user may also manipulate the position of graph 200 in the graphical user interface by rotating wheels 232 and 234. For example, as best seen in FIG. 7, coordinates system 202 may be rotated such that the user has a direct view of the plane formed by X-axis 204 and Z-axis 208. This view allows the user to more precisely identify the current price and the change from close of the user preferred securities that are represented by icons 210-218. Referring again to FIG. 6A, the user of client system 14 may also change the size of graph 200 to more precisely view a particular area of graph 200 by rotating wheel 236.

Figure 8:
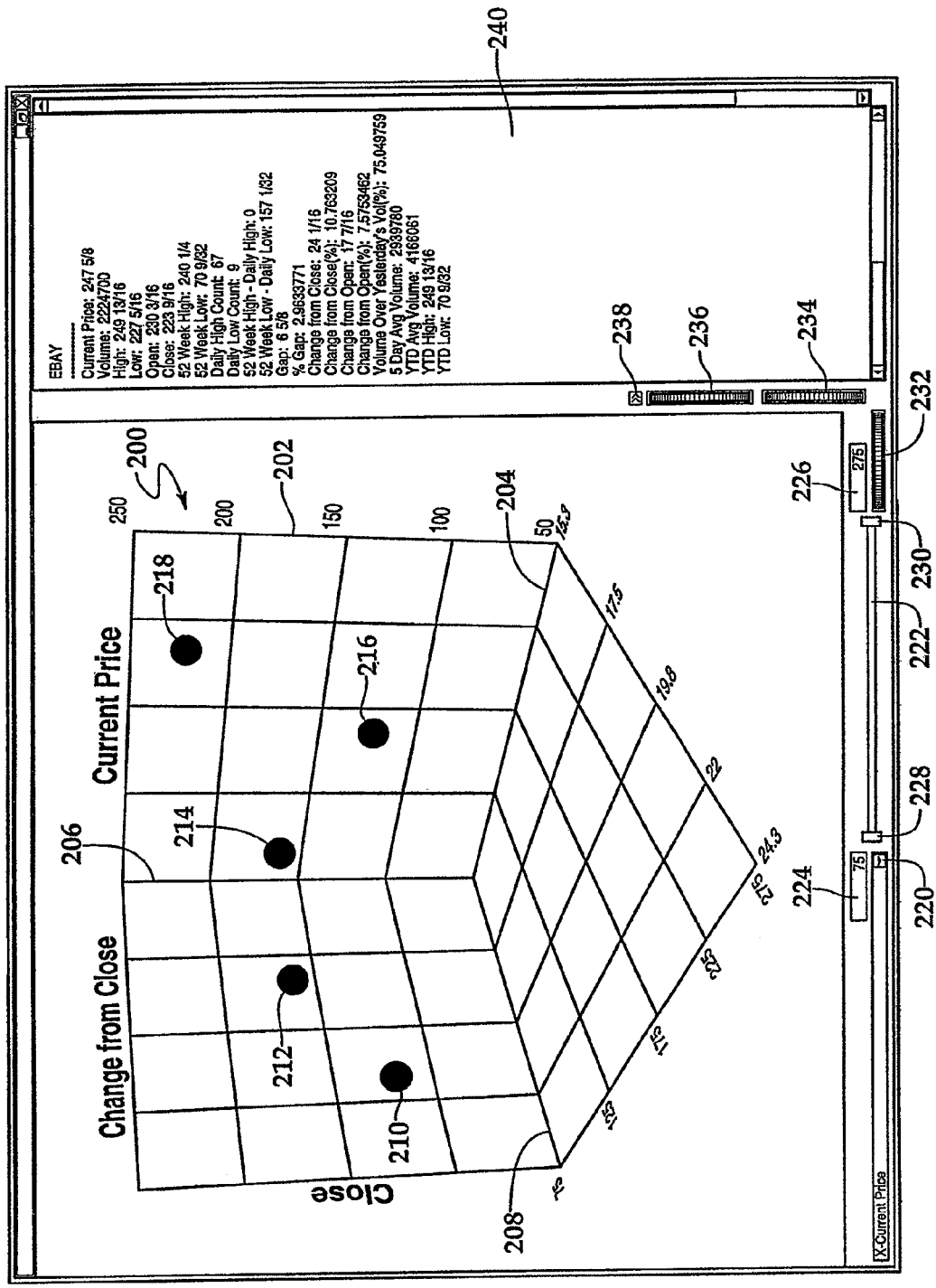
FIG. 8 is screen diagram of the three dimensional graph of FIG. 6A with a listing of criteria for a selected security.

If the user of client system 14 wants to know which security is represented by a particular icon and wants to view additional information about that particular security, the user may select that security and press button 238 to display, in list format, various criteria relating to the selected security. As best seen in FIG. 8, if icon 214 were selected and it represented ebay, the user would be able to view a plurality of criteria relating to ebay in a security list view window 240.

Figure 6B:
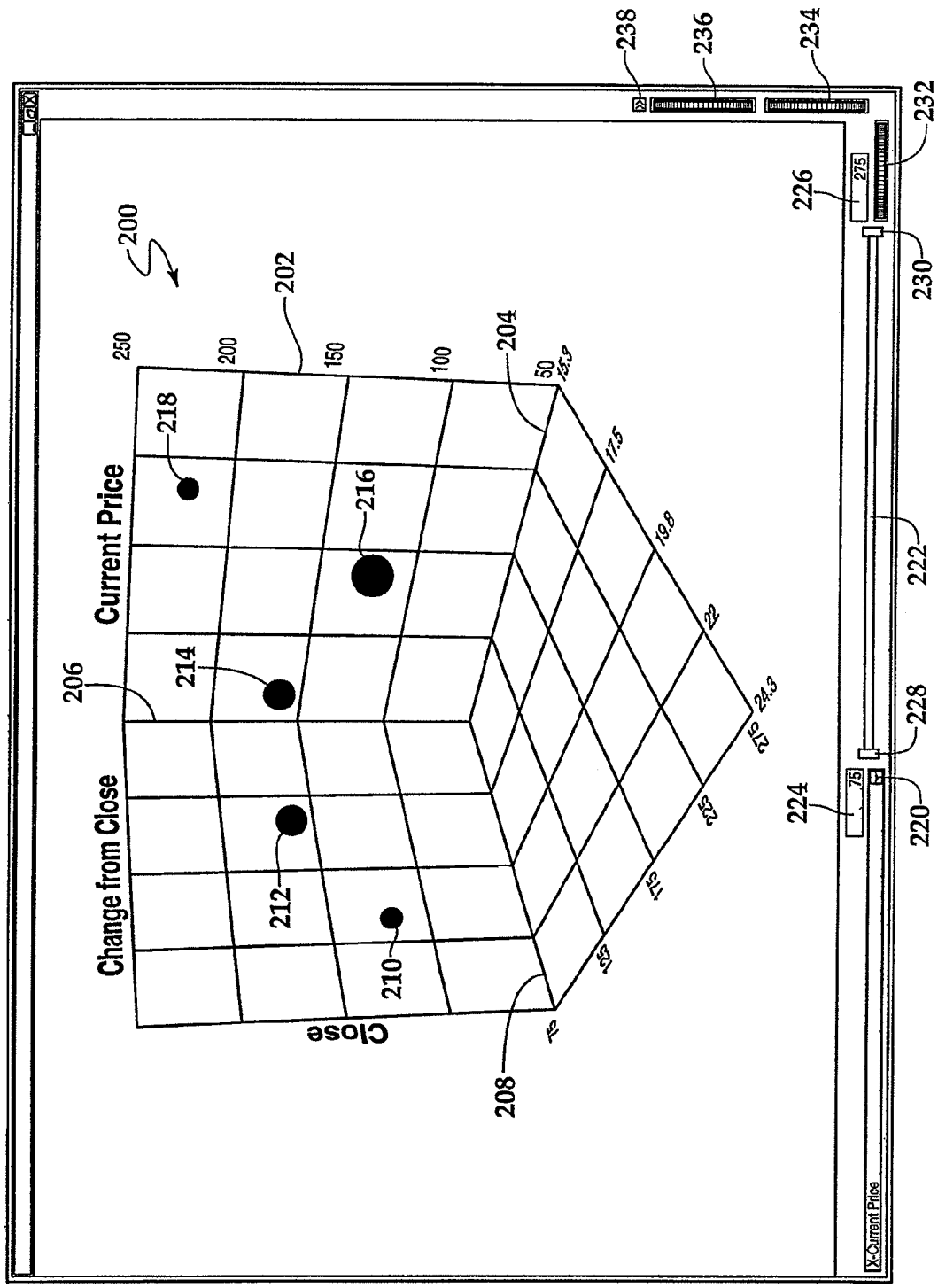

Referring now to FIG. 6B, therein is depicted a four dimensional graph 200 that graphically differentiates user preferred securities from one another. As with graph 200 of FIG. 6A, graph 200 of FIG. 6B uses coordinate system 202 for displaying the three user selected parameters of current price, close and change from close. In addition, graph 200 of FIG. 6B also utilizes the size of the icons 210-218 to represent a fourth parameter which, in the illustrated embodiment, is volume. The relative size of the icons 210-218 compare the volumes of the user preferred securities displayed in graph 200. Specifically, the security represented by icon 210 and the security represented by icon 218 have a relatively low volume while the security represented by icon 216 has a relatively high volume. The security represented by icon 212 and the security represented by icon 214 have volumes that fall between that of the security represented by icon 210 and the security represented by icon 216.

Figure 6C:
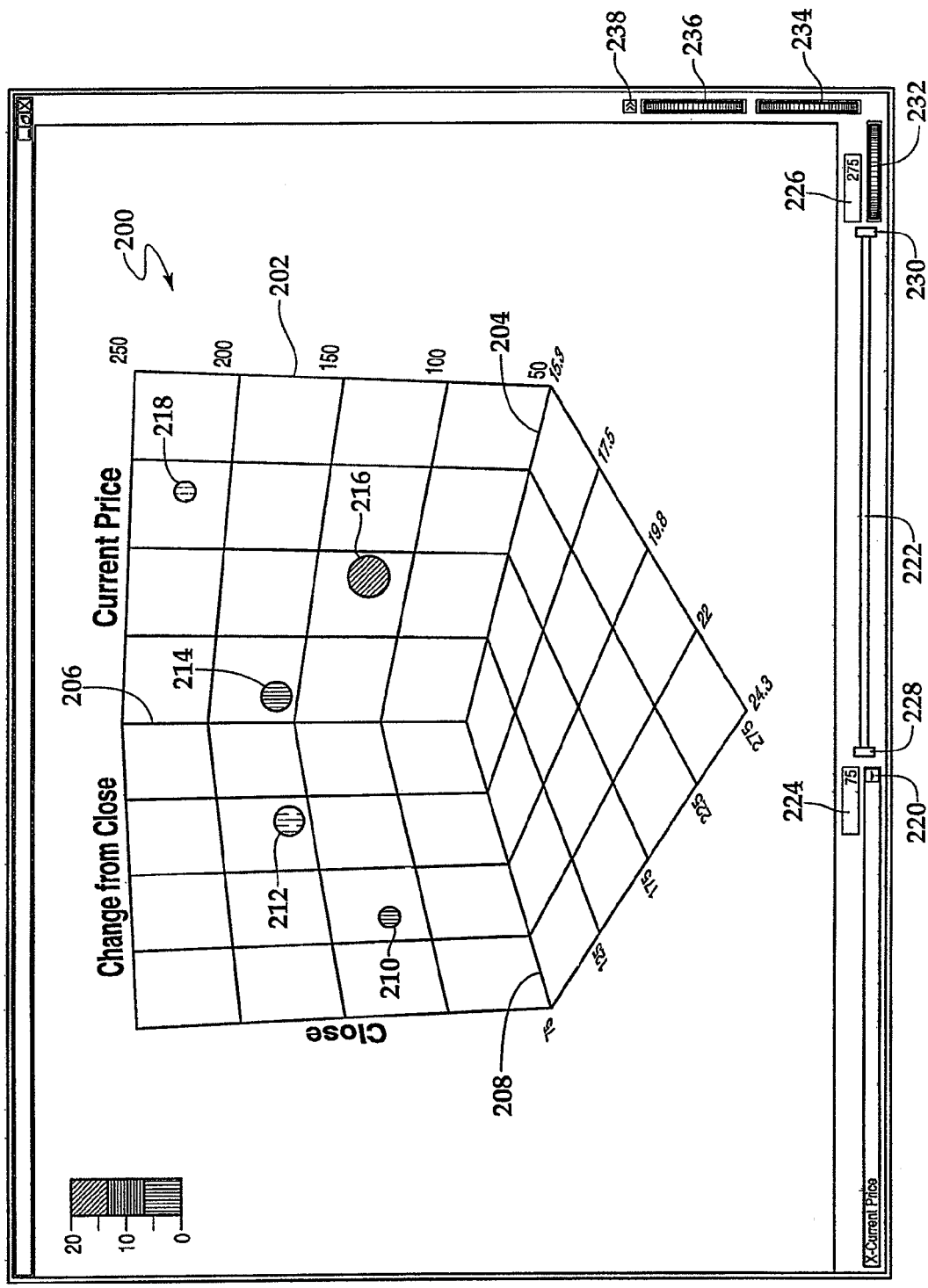

Referring next to FIG. 6C, therein is displayed a five dimensional graph 200. Graph 200 displays five user selected parameters which include current price on X-axis 204, close on Y-axis 206, change from close on Z-axis 208, volume based upon the size of icons 210-218 and change from open based upon the color of icons 210-218. In the illustrated example, the color spectrum, indicated by stippling, represents different percent changes from open ranging from zero to twenty percent.

Figure 6D:
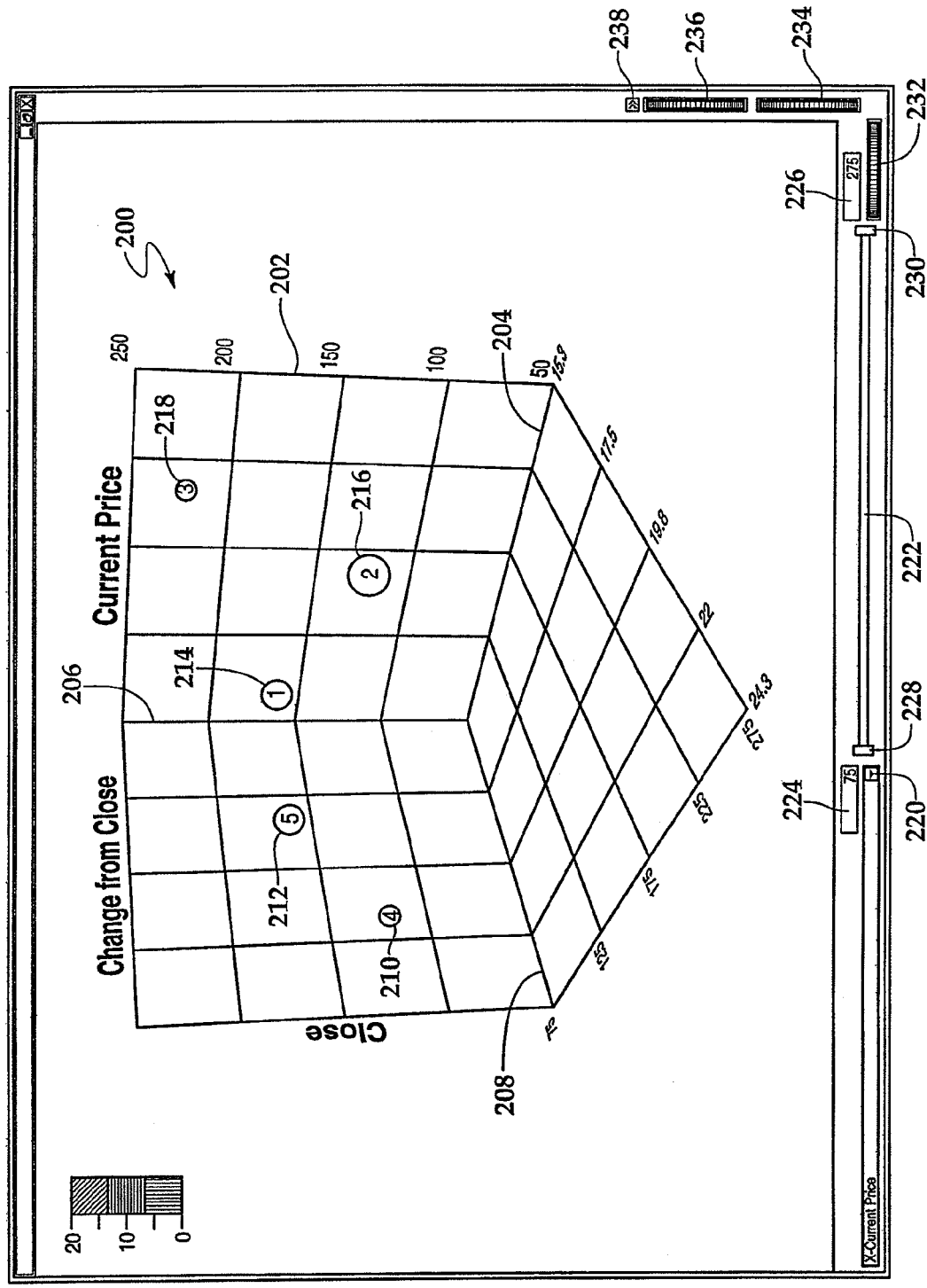

Referring now to FIG. 6D, therein is depicted a six dimensional graph 200 used to graphically differentiate user preferred securities from one another. In the illustrated embodiment, the six dimensions are represented by the three axis of the coordinates system 202, the size of icons 210-218, the color of icons 210-218 and the character symbology within icons 210-218. In this example, the six parameters represented on the six dimensional graph 200 are current price using X-axis 204, close using Y-axis 206, change from close using Z-axis 208, volume represented by the relative size of icons 210-218, percent change from open represented by the color of icons 210-218 and the relative market capitalization represented by the numerical character symbology within icons 210-218.

Figure 6E:
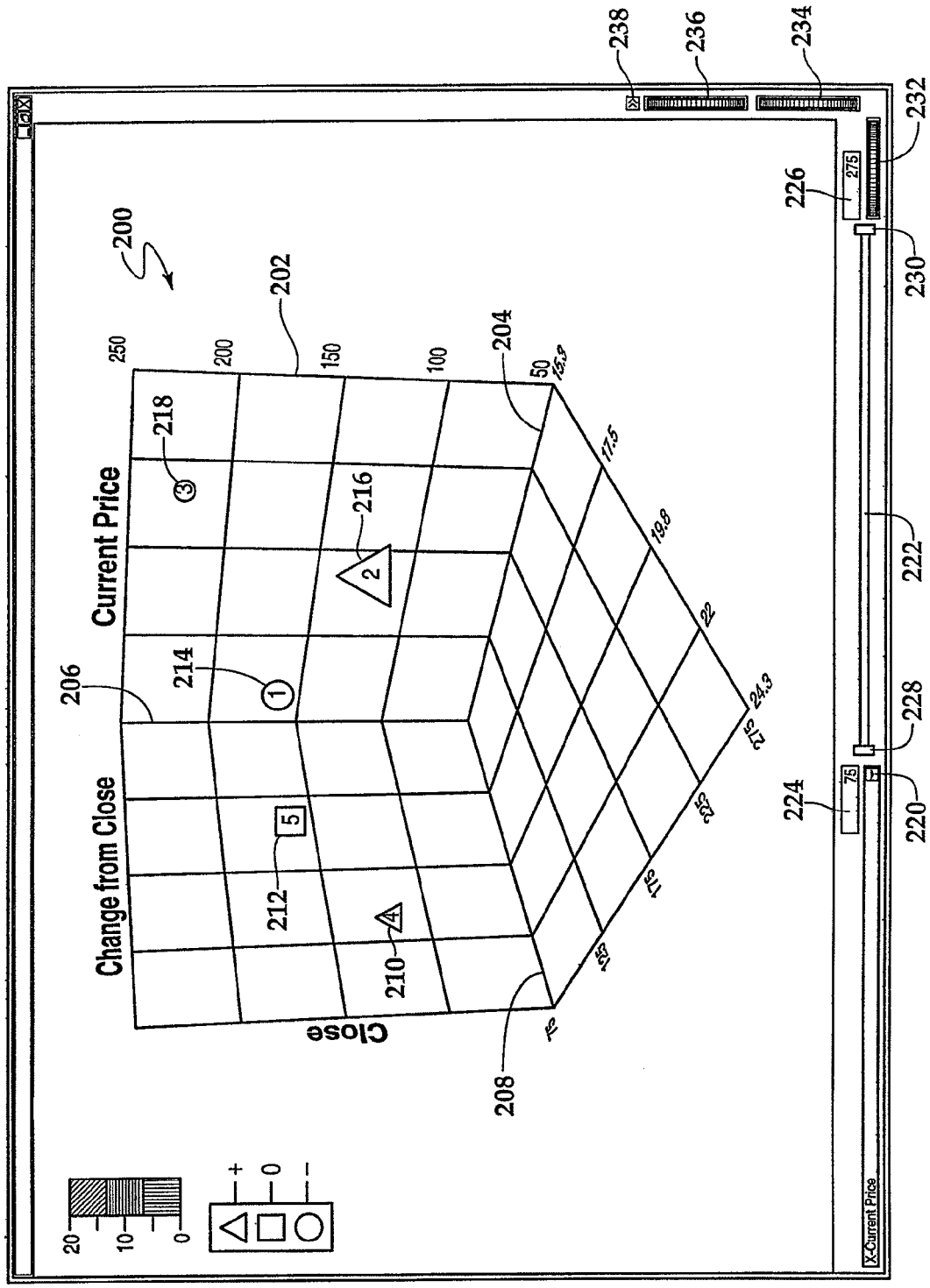

Referring now to FIG. 6E, therein is depicted a seven dimensional graph 200 for graphically differentiating user preferred securities from one another. Graph 200 allows the user to specify seven parameters for viewing the user preferred securities. Specifically, current price is represented on X-axis 204, close is represented Y-axis 206, change from close is represented on Z-axis 208, volume is represented by the size of icons 210-218, percent change from open is represented by the color of icons 210-218, rank order of market capitalization is represented by the numerical character symbology of icons 210-218 and relation to the five day simple moving average of the preferred securities is represented by the shape of icons 210-218. The triangles representing securities that are currently trading above the five day simple moving average, the circles represented by securities trading below the five day simple moving average and the square representing a security currently traded at its five day simply moving average.

Referring generally to FIGS. 6A-6E, the user of client system 14 views the user preferred securities that were identified based upon M user specific criteria that were sent to decision support server 82 for processing. The user preferred securities are placed on an N dimensional graph 200 based upon N user specific parameters. As should be apparent to those skilled in the art, the user may select any number of user specific criteria for identifying user preferred securities. Likewise, even though FIGS. 6A-6E have illustrated the use of between three and seven user specific parameters, the user of the present system could select any number of user specific parameters which could be displayed in multi-dimensional graphs having a larger number or a smaller number of dimensional characteristics. Additionally, it should be noted by those skilled in the art that the M user specific criteria used for selecting the user preferred securities may be the same as the N user specific parameters. Alternatively, however, the M user specific criteria and the N user specific parameters may have some overlapping characteristics or no overlapping characteristics.

Figure 9:
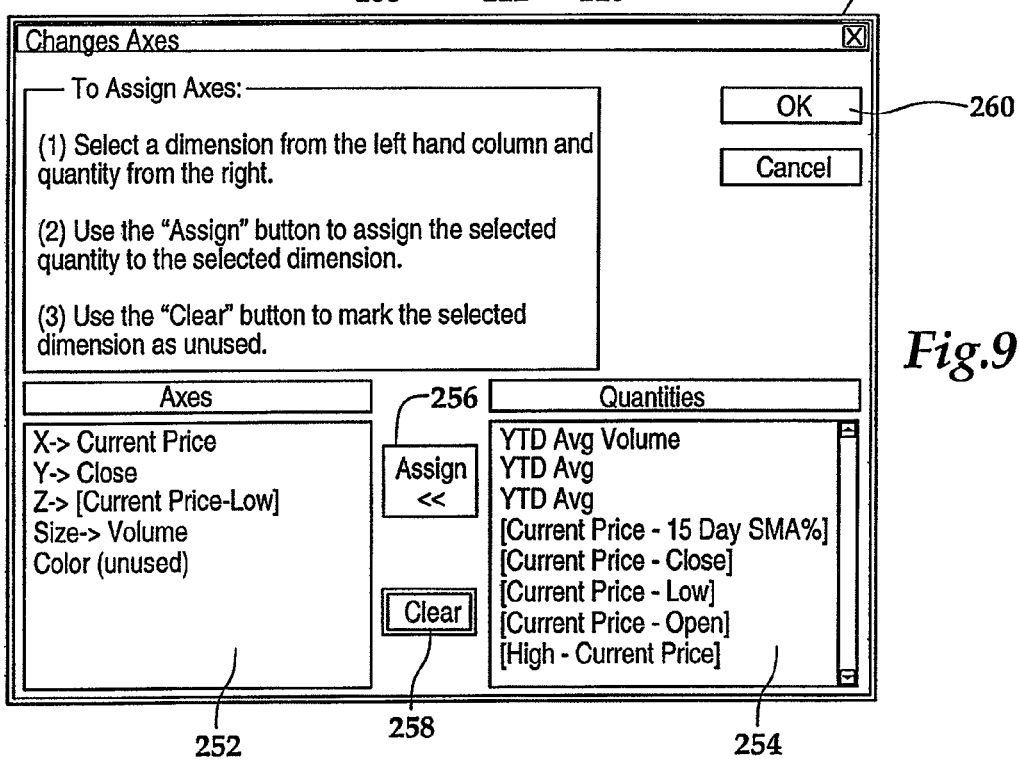
FIG. 9 is a graphical user interface for specifying user specific parameters for a system for graphically differentiating user preferred securities from one another in a multi-dimensional graph of the present invention.

Referring next to FIG. 9, therein is depicted a graphical user interface 250 that allows the user of client system 14 to change the parameters associated with the various dimensions on a graph 200. In the illustrated embodiment, five parameters are shown in Axes box 252. Specifically, in Axes box 252, the X-axis represents current price, the Y-axis represents close, the Z-axis represents current price-low, size represents volume and color has not been assigned a characteristic. The parameters are assigned based on a pick list within Quantities box 254. To assign a characteristic to one of the parameters in Axes box 252, the user selects that parameter, for example color and then selects a characteristic from Quantities box 242. Thereafter, the user pushes the Assign button 256 to assign that characteristic to a parameter. If the user wants to redesignate new characteristics to each of the parameters listed in Axes box 252, the user pushes the Clear button 258. Once the user has selected the desired characteristic for each of the parameters, the user pushes the Okay button 260 to view a graph 200 with those selected parameters.

Figure 10:
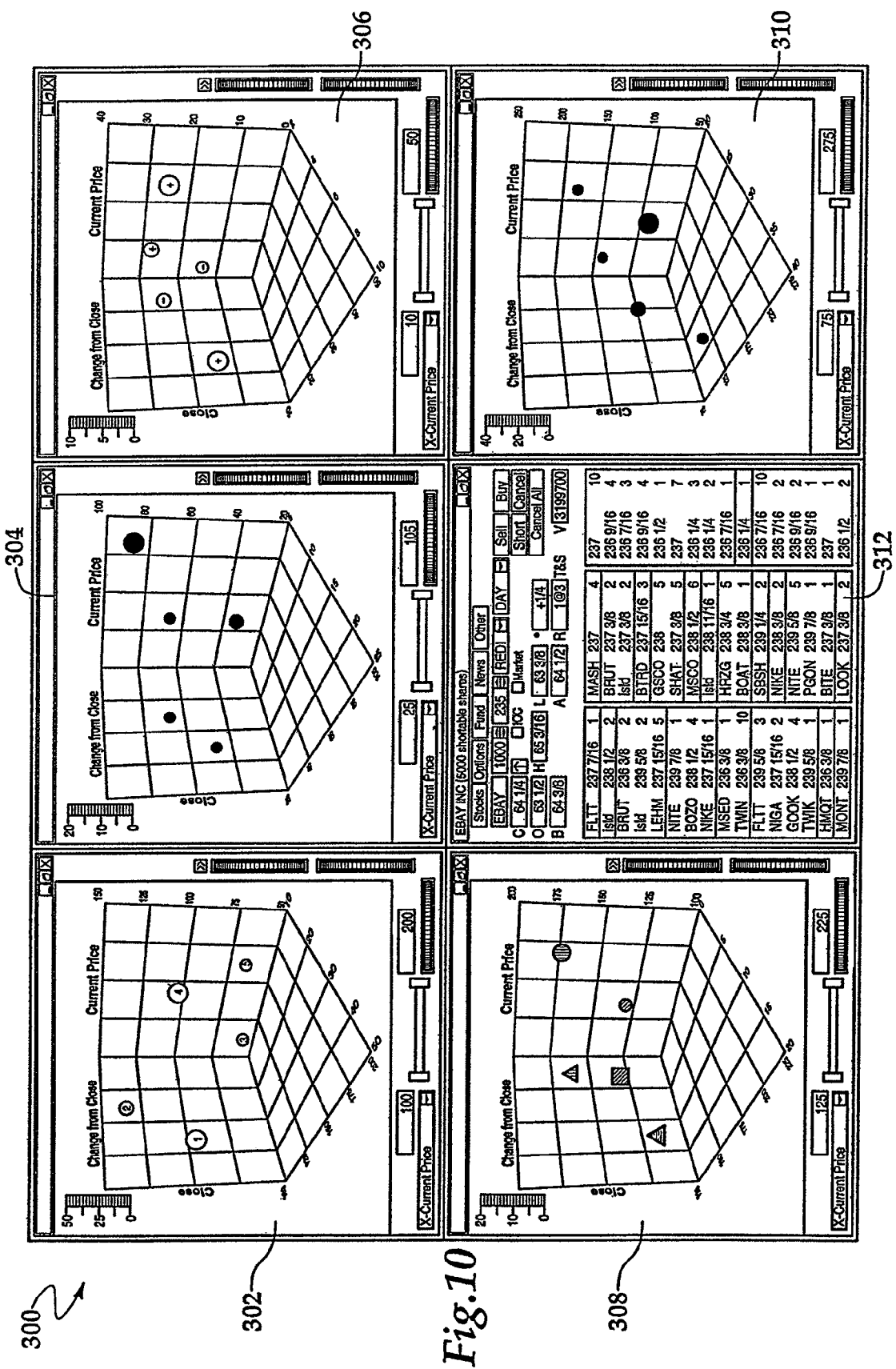
FIG. 10 is a graphical user interface of multiple multi-dimensional graphs for a system for graphically differentiating user preferred securities from one another of the present invention.

Referring now to FIG. 10, therein is depicted a graphical user interface 300 that may be viewed on monitor 20 of client system 14. This graphical user interface includes graph 302, graph 304, graph 306, graph 308 and graph 310. Each of these graphs represent a particular trading strategy that the user of the system of the present invention may select. In this view, the user of the system of the present invention may select any one of the securities represented by any one of the icons on any one of the graphs 302-310. When the user selects the desired security, real-time information relating to that security appears in stock box 312. Specifically, stock box 312 includes level one information, level two information as well as time and sales information relating to the selected security.

As such, the system for graphically differentiating user preferred securities from one another of the present invention allows the user to operate multiple trading models using multiple N dimensional graphs such that a tremendous amount of information is available to the user in an understandable format. Specifically, in the illustrated embodiment, twenty-five user preferred securities have been identified based upon five different trading models each of which has its own M user specific criteria associated therewith. In addition, the user may select N number of parameters in each graph for displaying the user preferred securities identified in each trading model.

While FIG. 10 has been described as having five graphs 302-310 each having five user preferred securities displayed thereon, it should be understood by those skilled in the art that the number of graphs as well as the number of user preferred securities in each graph may be changed and is selected based upon user preference. As such, the user may receive as much information as the user believes is helpful in identifying which securities to trade.

Figure 11:
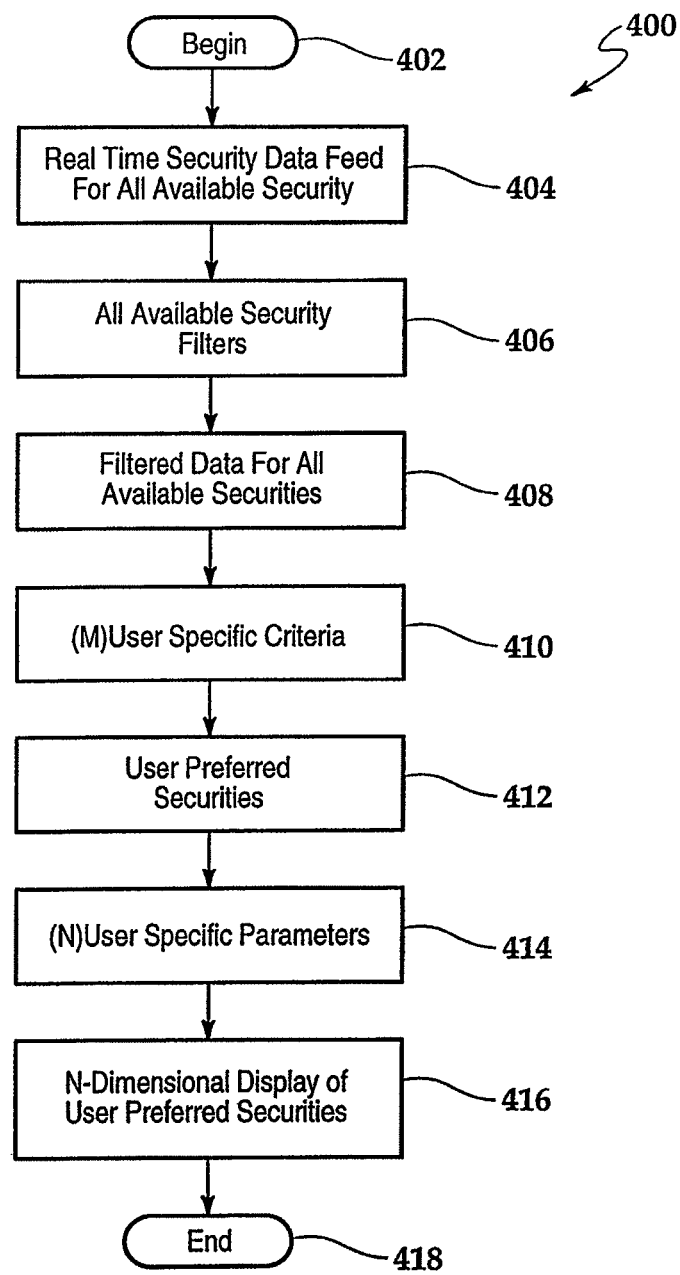
FIG. 11 is a flow diagram of a method for graphically differentiating user preferred securities from one another of the present invention.

Referring now to FIG. 11, and with reference to FIG. 1, therein is depicted a flow diagram of a method for graphically differentiating user preferred securities from one another in an N dimensional graph. The method 400 begins at step 402. In step 404, real-time security data is provided from a security data source 26 to server system 12. Server system 12 processes the security data feed using all available filters in step 406 to generate filtered data for all available securities in step

408. In step 410, the user provides M user specific criteria to the server system 12 from a client system 14 such that the server system 12 may identify the securities that meet the M user specific criteria, i.e., user preferred securities, in step 412. In step 414, the user provides N user specific parameters to the client system 14 which are used in step 416 to create an N dimensional graph that is populated by icons representing the user preferred securities, which ends the process at step 418. As such, the computer method and system for graphically differentiating user preferred securities from one another in a, multi-dimensional graph provides the user with a decision support tool that allows the user to identify securities of interest.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for graphically differentiating user preferred securities comprising:
   receiving security data for a plurality of securities from a security data source;
   receiving user specific criteria for analyzing the security data from a client system;
   identifying the user preferred securities from the plurality of securities based upon the user specific criteria;
   receiving N user specific parameters of the security data from the client system; and
   generating representations of the user preferred securities in an N dimensional graph, by a server system, based upon the N user specific parameters, thereby graphically differentiating the user preferred securities from one another.

2. The method as recited in claim 1 wherein the step of receiving security data for the plurality of securities further comprises receiving a real-time security data stream from the security data source.

3. The method as recited in claim 2 further comprising the step of parsing the real-time security data stream into a predetermined number of security related factors.

4. The method as recited in claim 1 wherein the step of receiving security data for the plurality of securities further comprises receiving fundamental data relating to the plurality of securities.

5. The method as recited in claim 1 wherein the step of receiving security data for the plurality of securities further comprises receiving analytical data relating to the plurality of securities.

6. The method as recited in claim 1 further comprising providing the client system with data relating to the user preferred securities.

7. The method as recited in claim 1 wherein the step of generating the user preferred securities in an N dimensional graph based upon the N user specific parameters further comprises generating the N dimensions by selecting dimensional representations from a group including icon position on a coordinate system, icon colors, icon sizes, icon shapes, icon shadings and character symbology icons.

8. A client system suitable for use with a server system, for graphically differentiating user preferred securities from one another for a user, the client system comprising a non-transitory computer readable medium having sets of instructions thereon, which when executed by a computer cause the computer to:
   receive user specific criteria for analyzing security data for a plurality of securities from the user and transmit the user specific criteria to the server system;
   identify user preferred securities from a plurality of securities based upon the user specific criteria in the server system, wherein the security data for the plurality of securities is provided to the server system from a security data source;
   receive N user specific parameters of the security data from the user; and
   represent the user preferred securities in an N dimensional graph based upon the N user specific parameters.

9. The client system as recited in claim 8 wherein the display system graphically represents the user preferred securities by selecting dimensional representations from a group including icon position on a coordinate system, icon colors, icon sizes, icon shapes, icon shadings and character symbology icons.

10. The client system as recited in claim 8 wherein the client system further comprises a code segment embodied on a computer-readable medium that directs the client system to present to the user an interface that allows the user to select user specific criteria for analyzing the security data.

11. The client system as recited in claim 8 wherein the client system comprises a code segment embodied on a computer-readable medium that directs the client system to present to the user an interface that allows the user to select user specific parameters of the security data upon which the identified preferred securities can be differentiated.

12. A server system suitable for use with a client system and a security data source, for graphically differentiating user preferred securities from one another for a user, the server system comprising a non-transitory computer readable medium having sets of instructions thereon, which when executed by a computer cause the computer to:
   receive security data for a plurality of securities from the security data source;
   receive user specific criteria for analyzing the security data from the client system;
   identify the user preferred securities from the plurality of securities based upon the user specific criteria;
   receive N user specific parameters of the security data from the client system; and
   generate representations of the user preferred securities in an N dimensional graph based upon the N user specific parameters, thereby graphically differentiating the user preferred securities from one another.

13. The server system as recited in claim 12 further comprising a code segment embodied on a computer-readable medium that directs the server system to receive a real-time security data stream from the security data source.

14. The server system as recited in claim 13 further comprising a code segment embodied on a computer-readable medium that directs the server system to parse the real-time security data stream from the security data source into a predetermined number of security related factors.

15. The server system as recited in claim 12 wherein the security data for the plurality of securities further comprises fundamental data relating to the plurality of securities.

16. The server system as recited in claim 12 wherein the security data for the plurality of securities further comprises analytical data relating to the plurality of securities.

17. The server system as recited in claim 12 further comprising a code segment embodied on a computer-readable medium that directs the server system to generate the user preferred securities by selecting dimensional representations from a group including icon position on a coordinate system, icon colors, icon sizes, icon shapes, icon shadings and character symbology icons.

18. A method for graphically differentiating user preferred securities comprising:
- receiving user specific criteria for analyzing security data for a plurality of securities from a user and transmitting the user specific criteria to a server system;
- identifying the user preferred securities from the plurality of securities based upon the user specific criteria, wherein the security data for the plurality of securities is provided to the server system from a security data source;
- receiving N user specific parameters of the security data from the user; and
- representing the user preferred securities in an N dimensional graph based upon the N user specific parameters, thereby graphically differentiating the user preferred securities from one another.

19. The method as recited in claim 18 further comprising representing the user preferred securities by selecting dimensional representations from a group including icon position on a coordinate system, icon colors, icon sizes, icon shapes, icon shadings and character symbology.

20. The method as recited in claim 18 further comprising presenting to the user an interface that allows the user to select user specific criteria for analyzing the security data.

21. The method as recited in claim 18 further comprising presenting to the user an interface that allows the user to select user specific parameters of the security data upon which the identified preferred securities can be differentiated.

22. A method for graphically differentiating user preferred securities comprising:
- receiving security data for a plurality of securities from a security data source;
- receiving user specific criteria for analyzing the security data from a client system;
- identifying the user preferred securities from the plurality of securities based upon the user specific criteria;
- receiving N user specific parameters of the security data from the client system; and
- generating representations of the user preferred securities in an N dimensional graph, by a server system, based upon the N user specific parameters, thereby graphically differentiating the user preferred securities from one another, wherein the N dimensional graph comprises a three-dimensional coordinate system, where each axis represents one of the N user specific parameters of the security data, wherein each user preferred security is represented by a corresponding icon in the three-dimensional coordinate system, where each icon represents a single user preferred security, and wherein each icon is located within the coordinate system in relation to the values that the icon's corresponding security has for three of the N user specific parameters.

23. The method of claim 22, wherein each of the size, shape, color, or shading of each icon is determined in relation to a value that the icon's corresponding security has for other of the N user specific parameters in addition to the three of the N user specific parameters included as the axes of the N dimensional graph.

* * * * *